March 28, 1967  F. SCHLOSS  3,311,761
TRANSDUCER MOUNTING
Filed Dec. 26, 1963

INVENTOR.
FRED SCHLOSS
BY *OLHodges*

ATTY.

United States Patent Office 3,311,761
Patented Mar. 28, 1967

3,311,761
TRANSDUCER MOUNTING
Fred Schloss, Arlington, Va., assignor to the United States of America as represented by the Secretary of the Navy
Filed Dec. 26, 1963, Ser. No. 333,769
13 Claims. (Cl. 310—8.4)

The invention described herein may be manufactured and used by or for the Government of the United States of America for governmental purposes without the payment of any royalties thereon or therefor.

The present invention relates to transducers, and more specifically to a mounting for increasing the acceleration sensitivity of transducers.

Piezoelectric and piezoresistive crystals or synthetic crystals may be effectively employed in accelerometers for measuring the acceleration of moving objects. One manner of using these crystals in accelerometers is by mounting discs of piezoelectric or piezoresistive material in the accelerometer so that the surface of the disc are perpendicular to the direction of the acceleration to be measured. As the object and accelerometer move, the disc is flexed creating stresses therein which produce a voltage. By measuring the voltage output of the disc, the acceleration of the object can be determined.

The acceleration sensitivity of the above-mentioned disc-shaped transducers is proportional to the surface area of the disc, and inversely proportional to the thickness.

Thus, the acceleration sensitivity of the disc may be increased by increasing the surface area of the disc, or by thinning the disc. However, when used in accelerometers it is desirable to keep the size of the disc small so that the accelerometer may be kept small. Moreover, when the disc is thinned it becomes fragile, difficult to handle, and costly to manufacture. As can be seen, there is a need for a way to increase the acceleration sensitivity of these piezoelectric or piezoresistive discs without increasing their size or making them very thin and fragile.

One manner of satisfying this need is by securing the disc to a diaphragm. When this is done, the movement of the accelerometer will cause flexure of the diaphragm, and this flexure will be transmitted to the piezoelectric or piezoresistive disc creating stresses which produce a measurable voltage. When the disc is secured to the diaphragm, its acceleration sensitivity is proportional to the thickness of the disc and to the surface area of the diaphragm, and is inversely proportional to the thickness of the diaphragm, when the thickness of the diaphragm is large with respect to the thickness of the disc. However, when the thickness of the disc approaches the thickness of the diaphragm, the disc will have a stiffening effect on the diaphragm, thus increasing its resistance to bending and detracting from the acceleration sensitivity of the combination. As can be seen, the acceleration sensitivity of this device may be increased by decreasing the thickness of the disc or increasing the thickness of the diaphragm. However, there is structural restriction limiting the amount that the acceleration sensitivity may be increased; namely, the relative thickness of the disc and diaphragm.

Another way to increase the acceleration sensitivity of a piezoelectric or piezoresistive disc is to increase its inertial load. This may be done by securing a mass of material on either the disc or the diaphragm on which the disc is mounted. While this will produce greater stresses, and hence a larger measurable voltage for a given acceleration, the mass will have a stiffening affect on the crystal and/or the diaphragm on which the crystal is mounted.

The present invention overcomes these limitations by mass loading the diaphragm in such a manner that the diaphragm is not stiffened substantially. This increases the inertial load of the diaphragm causing greater stresses in the disc for a given acceleration.

Accordingly, it is an object of this invention to provide a transducer assembly having improved acceleration sensitivity.

It is another object of this invention to provide a mounting assembly for a disc-shaped transducer which will render the transducer highly sensitive to acceleration.

It is still another object of the present invention to provide a means for mounting a piezoelectric or piezoresistive crystal or synthetic crystal type transducer having a high acceleration sensitivity, for use in accelerometers or the like.

Other objects and many of the attendant advantages of this invention will be readily appreciated as the same becomes better understood by reference to the following detailed description when considered in connection with the accompanying drawings, in which like reference numerals designate like parts throughout the figures thereof, and wherein.

Figure 1:
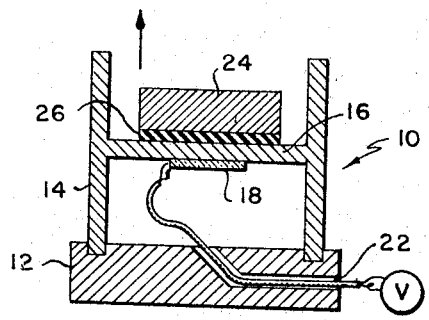
FIG. 1 is a vertical sectional view of one embodiment of the invention.

FIG. 1 shows an upstanding support member 10 mounted on a base 12 including walls 14 and a diaphragm 16 supported therebetween. A piezoelectric disc 18 is secured to the bottom surface of diaphragm 16 so that it will bend therewith. Secured on the top and bottom surfaces of disc 18 are electrodes for facilitating voltage measurement when the disc is stressed and creates a voltage. Base 12 has a channel 22 therethrough through which electrical wiring may pass to connect disc 18 to a voltmeter or some other measuring instrument. A mass of material 24 rests on the top surface of diaphragm 16 to increase the inertial load thereon. The mass 24 will create greater bending stresses in the diaphragm when the support member is accelerated in the direction of the arrow in FIG. 1, than would be created without the mass. In order to minimize the stiffening effect of the mass on the diaphragm a thin compliant layer of material 26, such as rubber or thick grease, is interposed between the mass and the diaphragm. This compliant layer must be thick enough to keep the mass from stiffening the diaphragm, yet not so thick that its axial stiffness will be low and greatly affect the resonant frequency of the diaphragm.

Figure 2:
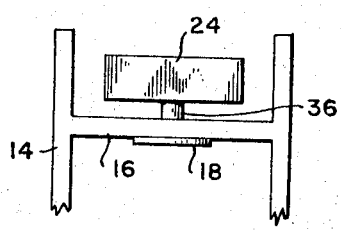
FIG. 2 is an elevation view of another embodiment of the invention.
Figure 3:
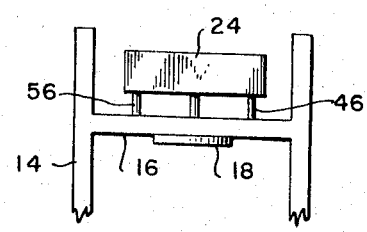
FIG. 3 is an elevation view of still another embodiment of the invention.
Figure 4:
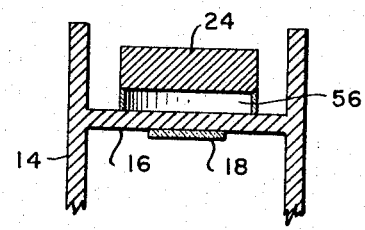
FIG. 4 is a vertical sectional view of a further embodiment of the invention.

The embodiments of FIGS. 2, 3 and 4 are similar to that of FIG. 1, differing only in the means interposed between the mass and diaphragm to prevent the mass from stiffening the diaphragm. FIG. 2 shows the use of a small pedestal 36, FIG. 3 shows the use of three or more thin rods 46, and FIG. 4 shows the use of a thin cylindrical shell 56 to concentrate the weight of the mass on a very small area of the diaphragm, thereby preventing the mass from substantially stiffening the whole diaphragm. Thus, in each of these embodiments, as in the embodiment of FIG. 1, mass 24 increases the inertial load on the diaphragm without stiffening it. This inertial load will cause greater stresses to be created in the diaphragm and disc in response to a given acceleration.

Figure 5:
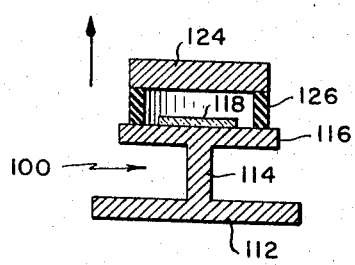
FIG. 5 is a vertical sectional view of still another embodiment of the invention.

The embodiment of FIG. 5 shows a mounting for increasing the acceleration sensitivity of a piezoelectric disc-type transducer which is secured to a center supported diaphragm. Diaphragm 116 is supported at its center by post 114 upstanding from base 112. Mass 124, through compliant ring member 126, creates an inertial load on diaphragm 116 without stiffening it. As the support member 100 is accelerated in the direction of the arrow in FIG. 5, mass 124 creates greater bending stresses in the diaphragm and disc than would be created without the mass.

It should be understood that the long thin pedestals 46 of FIG. 3, or the thin cylindrical shell 56 of FIG. 4 may be employed in place of compliant ring 126 to mass load the diaphragm without stiffening it, in the same manner that they carry out this function in the embodiments of FIGS. 3 and 4.

It should be noted that when measuring acceleration, it is desirable to keep the response of the transducer to transverse movement to a minimum. Since the post 114 of the center supported diaphragm mount has a lower transverse resonant frequency than walls 14 of the end supported diaphragm mount, the transducer it supports will respond more readily to transverse movement. Therefore, when used in an accelerometer, the end supported diaphragm mount is more effective than the center supported diaphragm mount.

Obviously, many modifications and variations of the present invention are possible in the light of the above teachings. It is, therefore, to be understood, that within the scope of the appended claims, the invention may be practiced otherwise than as specifically described.

What is claimed is:

1. A mounting for increasing the acceleration sensitivity of a transducer, including:
   a mounting means;
   a flexible diaphragm, said flexible diaphragm being secured to said mounting means;
   a disc-shaped transducer secured to one surface of said diaphragm;
   a mass of material for creating an inertial load on said diaphragm; and
   means interposed between said diaphragm and said mass of material for seating said mass on said diaphragm and for increasing the inertial load on said diaphragm without stiffening it, said means for seating said mass on said diaphragm is a compliant layer of material.

2. A transducer mounting according to claim 1, wherein said compliant layer of material is a thin layer of rubber.

3. A transducer mounting according to claim 1, wherein said compliant layer of material is a thin coating of thick grease.

4. A mounting for increasing the acceleration sensitivity of a transducer, including:
   a mounting means;
   a flexible diaphragm, said flexible diaphragm being secured to said mounting means;
   a disc-shaped transducer secured to one surface of said diaphragm;
   a mass of material for creating an inertial load on said diaphragm; and
   means interposed between said diaphragm and said mass of material for seating said mass on said diaphragm, and for increasing the inertial load on said diaphragm without stiffening it, said means for seating said mass on said diaphragm is at least three thin rods disposed perpendicular to said diaphragm and said mass.

5. A mounting for increasing the acceleration sensitivity of a transducer, including:
   a mounting means;
   a flexible diaphragm, said flexible diaphragm being secured to said mounting means;
   a disc-shaped transducer secured to one surface of said diaphragm;
   a mass of material for creating an inertial load on said diaphragm; and
   means interposed between said diaphragm and said mass of material for seating said mass on said diaphragm, and for increasing the inertial load on said diaphragm without stiffening it, wherein said means for seating said mass on said diaphragm is a thin cylindrical shell.

6. A mounting for increasing the acceleration sensitivity of a transducer, including:
   a mounting means;
   a flexible diaphragm, said flexible diaphragm being secured to said mounting means;
   a disc-shaped transducer secured to one surface of said diaphragm;
   a mass of material for creating an inertial load on said diaphragm; and
   means interposed between said diaphragm and said mass of material for seating said mass on said diaphragm, and for increasing the inertial load on said diaphragm without stiffening it, said means for seating said mass on said diaphragm is a rubber ring.

7. A transducer mounting according to claim 1, wherein said diaphragm is supported along its peripheral edge by at least one wall.

8. A mounting for increasing the acceleration sensitivity of a transducer, including:
   a mounting means;
   a flexible diaphragm, said flexible diaphragm being secured to said mounting means;
   a disc-shaped transducer secured to one surface of said diaphragm;
   a mass of material for creating an inertial load on said diaphragm; and
   means interposed between said diaphragm and said mass of material for seating said mass on said diaphragm, and for increasing the inertial load on said diaphragm without stiffening it, said diaphragm is supported at its center by post.

9. A mounting for increasing the acceleration sensitivity of a transducer, including:
   a mounting means;
   a flexible diaphragm, said flexible diaphragm being secured to said mounting means;
   a disc-shaped transducer secured to one surface of said diaphragm;
   a mass of material for creating an inertial load on said diaphragm; and
   means interposed between said diaphragm and said mass of material for seating said mass on said diaphragm, and for increasing the inertial load on said diaphragm without stiffening it, said transducer is secured on the top surface of said diaphragm.

10. A transducer mounting according to claim 1, wherein said transducer is secured on the bottom surface of said diaphragm.

11. A transducer mounting according to claim 1, wherein said disc-shaped transducer is a piezoelectric crystal.

12. A transducer mounting according to claim 1, wherein said disc-shaped transducer is a piezoresistive crystal.

13. A transducer support for increasing the acceleration sensitivity of a piezoelectric crystal, comprising:
   a base member;

a pair of parallel walls upstanding from said base member;
a diaphragm extending horizontally between said walls and supported along its peripheral edge thereby;
a piezoelectric disc-shaped crystal secured to the bottom surface of said diaphragm;
a thin layer of rubber seated on the upper surface of said diaphragm;
and a mass of material seated on said thin layer of rubber;
whereby said mass creates an inertial load on said diaphragm without stiffening it, thereby increasing the acceleration sensitivity of said diaphragm and said crystal.

References Cited by the Examiner

UNITED STATES PATENTS

| | | | |
|---|---|---|---|
| 2,411,401 | 11/1946 | Welch | 310—8.4 |
| 2,873,604 | 2/1959 | Samsel | 310—8.4 |
| 3,120,622 | 2/1964 | Dranetz et al. | 310—8.4 |
| 3,252,016 | 5/1966 | Hayer | 310—9.1 |

FOREIGN PATENTS 909,257   3/1954   Germany.

MILTON O. HIRSHFIELD, *Primary Examiner.*

J. D. MILLER, *Assistant Examiner.*